(12) United States Patent
Rossman et al.

(10) Patent No.: US 11,785,051 B1
(45) Date of Patent: Oct. 10, 2023

(54) CLOUD COMPUTING IDENTITY ECOSYSTEM

(71) Applicant: Amazon Technologies, Inc., Seattle, WA (US)

(72) Inventors: Hart Matthew Rossman, Vienna, VA (US); Neal J. Rothleder, Fairfax, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1,231 days.

(21) Appl. No.: 16/368,595

(22) Filed: Mar. 28, 2019

(51) Int. Cl.
*H04L 9/40* (2022.01)
*G06F 16/9535* (2019.01)
*G06F 7/14* (2006.01)
*G06F 16/901* (2019.01)
*G06F 16/9538* (2019.01)

(52) U.S. Cl.
CPC ............ *H04L 63/20* (2013.01); *G06F 7/14* (2013.01); *G06F 16/9024* (2019.01); *G06F 16/9535* (2019.01); *G06F 16/9538* (2019.01); *H04L 63/1433* (2013.01)

(58) Field of Classification Search
CPC .............................. H04L 63/20; H04L 63/1433
USPC .......................................................... 726/1
See application file for complete search history.

(56) References Cited

U.S. PATENT DOCUMENTS

| 11,108,828 | B1* | 8/2021 | Curtis et al. | H04L 63/104 |
| 2009/0297043 | A1* | 12/2009 | Hinton et al. | H04L 63/1433 382/219 |
| 2017/0155639 | A1* | 6/2017 | Hu et al. | H04W 4/50 |
| 2017/0264334 | A1* | 9/2017 | Lee et al. | H04B 1/0067 |
| 2020/0389495 | A1* | 12/2020 | Crabtree et al. | G06F 16/2477 |
| 2021/0168150 | A1* | 6/2021 | Ross et al. | G06F 16/9024 |
| 2022/0255926 | A1* | 8/2022 | Crabtree et al. | H04L 63/1425 |
| 2022/0263860 | A1* | 8/2022 | Crabtree et al. | H04L 63/1425 |

* cited by examiner

*Primary Examiner* — Dant B Shaifer Harriman
(74) *Attorney, Agent, or Firm* — LOWENSTEIN SANDLER LLP

(57) ABSTRACT

A processing device receives security data from a plurality of web services associated with an organization and stores the security data separately in an unstructured data storage. The processing device generates one or more purpose built databases from the security data in the unstructured data storage, the one or more purpose built databases merging the security data from the plurality of web services. The processing device further receives, from a requestor, an analysis request pertaining to the plurality of web services, executes an analysis using the one or more purpose built databases to generate a response to the analysis request, and provides the response to the analysis request to the requestor.

21 Claims, 10 Drawing Sheets

CLOUD COMPUTING IDENTITY ECOSYSTEM

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
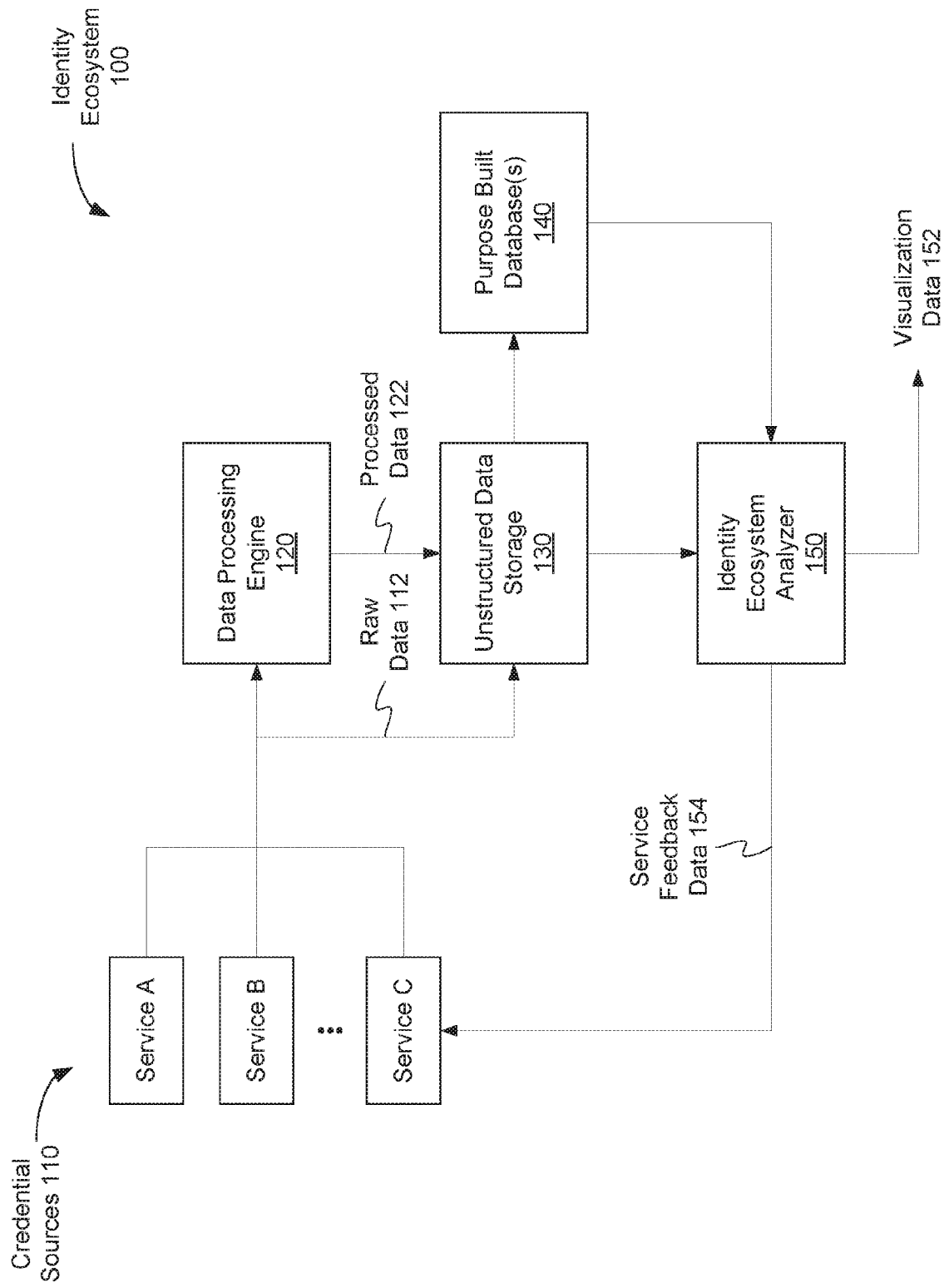
FIG. 1 is a block diagram illustrating an identity ecosystem architecture, according to an embodiment of the present disclosure.

The present disclosure relates to an identity and credential ecosystem to coordinate actions across multiple web services in a cloud computing context. Individual web services may enable users to store, access, rotate, and audit actions taken on their associated credentials, including security credentials, access credentials, etc. More broadly, cloud computing systems and services that manage secrets on behalf of customers/users generally have the ability to create, read, update, delete, broker, or store credentials, policies, resources, etc. In enterprise organizations or cloud computing environments, there may be a non-trivial number of independent services, each with their own policies, credentials, and resources. Although independent, these services may offer some at least some level of interplay with one another. For example, a first resource provided by one service could be used to access or modify a second resource managed by a different service.

With each of these services having disparate credentials and access/security policies, each service may generally perform authentication and authorization operations on an individual and per-request basis. For example, when a given service, such as an encryption key management service, receives a request for a particular key, that service may evaluate the credentials provided with the request against the relevant security policies to determine whether to grant the requestor access to the requested resource. This single service, however, may lack the insight into how granting access to the requested resource may impact the requestor's ability to use that resource in connection with other web services. Accordingly, higher level evaluations of the security vulnerabilities and risk factors across the various web services used or managed by a certain organization may not be feasible in conventional cloud computing environments.

Aspects of the present disclosure address these and other considerations by forming an identity and credential ecosystem to coordinate actions across multiple web services in a cloud computing context. In one embodiment, a cloud-based identity ecosystem analyzer can receive input information from the various web-services that are tasked with managing secrets and policies and can evaluate the threats, vulnerabilities, and risk factors associated with those services. With the services and systems that manage secrets as a source, in one embodiment, the identity ecosystem analyzer can implement a relationship network/graph to track the interplay between principals, credentials, permission policies, and resources. By applying a variety of algorithms and workflows, the identity ecosystem analyzer can probe security characteristics of the identity graph/ecosystem, evaluate risk, detect threats, and materially improve the security of the resources represented in the graph. Such a graph, for example, could connect any user of the various web services (represented by a unique user identifier) to all the credentials accessible to that user, all the policies attached to that user, and thereby to all of the resources that the user can access. With the implementation of such a network, the identity ecosystem analyzer can perform a variety of analyses that address and answer a wide range of questions pertaining to the security characteristics of the identity and credential ecosystem, as will be described in more detail herein.

FIG. 1 is a block diagram illustrating an identity ecosystem architecture 100, according to an embodiment of the present disclosure. In one embodiment, a number of credential sources 110 provide raw input data 112 in the identity ecosystem 100. The credential sources 110 (such as Service A, Service B, Service C, etc.) may include any web services utilized by, managed by, provided by, or otherwise associated with a particular entity, organization, group, etc. The credential sources 110 may include various services implemented, for example, by an on-demand cloud computing platform that provides virtual clusters of computing resources to customers over a network. The services that make up credential sources 110 may include computing services, storage services, network services, database services, analytics services, application services, deployment services, management services, mobile services, developer services, security services, or other services.

In one embodiment, each of credential sources 110 may provide raw data 112 to the identity ecosystem 100 including, for example, information pertaining to principals, credentials, permission policies, and resources. In one embodiment, the raw data 112 is received first by a data processing engine 120. The data processing engine 120 may itself be another web service configured to perform certain processing operations on the raw data 112 received from credential sources 110. For example, data processing engine 120 may parse the data raw data 112 to separate out data pertaining to each of the principals, the credentials, the permission policies, and the resources. In other embodiments, data processing engine 120 may perform other operations to clean up the data (e.g., remove extraneous, duplicate, or unnecessary pieces of data), transform the data, filter the data, reformat the data, or other otherwise process the raw data 112. Depending on the embodiment, the processed data 122 output by data processing engine 120 and/or the raw data 112 received directly from credential sources 110 can be stored in unstructured data storage 130. In one embodiment, unstructured data storage 130 can be implemented as a data lake. The data lake may include a system or repository of data stored in a natural and unstructured format, such as object blobs or files. In other embodiments, the data lake can include structured data, semi-structured data, unstructured data, and/or binary data. Unstructured data storage 130 can store the raw data 112 and processed data 122 until such data is retrieved and further processed for additional analysis.

In one embodiment, identity ecosystem 100 further includes identity ecosystem analyzer 150. In one embodiment, identity ecosystem analyzer 150, or some other logic, component, module, or service, generates one or more purpose built databases 140 from the data in unstructured data storage 130. Each of the one or more purpose built databases 140 may include the data from unstructured data storage 130 arranged and/or filtered in a particular manner. For example, in one embodiment, purposes built databases 140 includes a graph database to illustrate the relationships between principals, credentials, permission policies, and resources in the identity ecosystem 100, a relational database that can be used as a connected master index, and a time series database to illustrate how the identity ecosystem 100 evolves over time. In other embodiments, purpose built databases 140 may include any one or more of these types of databases, additional types of databases and/or different types of databases.

In one embodiment, identity ecosystem analyzer 150 can retrieve the data from unstructured data storage 130 and/or from purpose built databases 140 in order to perform additional analyses to evaluate security threats, vulnerabilities and risk factors in identity ecosystem 100. Some examples of the types of analyses that can be performed are described herein, although these examples should not be considered an exhaustive list. Depending on the embodiment, the analysis can generate visualization data 152 that can be used to render a visual output of the analysis for display on a connected display device or transmission to a user/customer device for display, and/or service feedback data 154 which can be provided back to one or more of the credential sources 110.

In one embodiment, identity ecosystem analyzer 150 can perform a blast radius estimation where, for a given credential, identity ecosystem analyzer 150 can identify any resources that could be compromised directly (i.e., that can be accessed using that credential via one "hop"), as well as indirectly (i.e., multiple hops, such as using the credential to change a policy to allow access to a new resource). The blast radius estimation can further identify a number of points of access, the occurrence of identity federation, any unusually highly credentialed users, or any unused or infrequently used credentials. The blast radius estimation can further identify, for any permission policy, the credentials and resources to which the policy permits access, as well as other metrics such as a shortest access path, cluster connectivity, outliers and edges, distance, amplifiers/influencers, or other measures of centrality.

In one embodiment, identity ecosystem analyzer 150 can perform a general analysis of the identity ecosystem 100. For example, identity ecosystem analyzer 150 can create a visual representation of the network principals, credentials, permission policies, and resources, both within an individual web service as well as spanning multiple web services. Identity ecosystem analyzer 150 can further generate visualization data 152 which can be used to render the visual representation of a credential cluster chain of customer, such as by mapping a chain of custody and providing visual cues for threats, risks, vulnerabilities, etc. Via search commands and other user input, the visualization can facilitate navigation and exploration of relationships by an administrator, customer, or other user. Identity ecosystem analyzer 150 can further use machine learning and/or statistical methods to identify related credentials (i.e., credential clusters) and derive relationships from metadata (including origin, user, system/workload, dates, geo, time to live/rotation schedule, type of credential, order of credential use to gain system access, etc.), scope of access, frequency of access, frequency of rejection, and other properties. In one embodiment, the general analysis of the identity ecosystem 100 further includes a cluster analysis to determine groupings based on identity characteristics (e.g. similarity in access, type of credential access, similarity in policies across credentials, frequency of access) and outliers and can use machine learning or another formal method/model theorem prover to establish the chain of custody within and the reachability of the credentials clusters. After collecting a list of principal users and all of the credentials associated therewith (e.g., by traversing the graph database), this data can be applied to any of a variety of clustering algorithms. For example, identity ecosystem analyzer 150 can use an Expectation Maximization (EM) clustering model (e.g., a Gaussian mixture model) to group the user credential data. In doing this, identity ecosystem analyzer 150 can derive groups of users with similar sets of credentials (which can later be visually inspected and named or categorized). For example, users with multiple high-access credentials might be manually labeled "Administrators." These clusters can be used to guide granting of permissions in the future to new employees, or to identify potential threats and vulnerabilities. To do the latter, for the users in each cluster, identity ecosystem analyzer 150 can cross-reference additional metadata about those users (e.g., from the relational database). For example, there might be a cluster of users with access to financial resources. By cross-referencing metadata about those users' organizational department(s), identity ecosystem analyzer 150 might identify outlier users in that cluster that do not belong to any of the traditional financial organizational groups.

In another embodiment, identity ecosystem analyzer 150 can analyze the power, influence, and importance of certain entities and objects in the identity ecosystem 100. For example, identity ecosystem analyzer 150 can determine which credentials or policies enable the most impactful influence, or which principals have the most power to access resources. Identity ecosystem analyzer 150 can further determine what changes might be made to adjust the power dynamics, as well as determine any relevant power differentials (e.g., identifying a high ranking employee with relatively little access or an entry level employee with unusually high amount of privileged user access).

In another embodiment, identity ecosystem analyzer 150 can perform a formal verification of assertions made in the permission policies and between policies. This verification can explain trust properties in the identity ecosystem 100 and compute corresponding trust scores across the network. In another embodiment, identity ecosystem analyzer 150 can determine reachability metrics including under what conditions which principals can access which resources, and under what conditions a particular resource can be accessed. In another embodiment, identity ecosystem analyzer 150 can recognize consumer to author relationships including who can author permissions and distribute credentials and who are the authorized consumers of these permission policies and generated credentials.

In another embodiment, identity ecosystem analyzer 150 can evaluate one or more trust planes. With bi-lateral consent, identity ecosystem analyzer 150 can establish credential clusters between web service accounts (e.g. cross account roles, federated access, etc.) or web service customer (e.g. could include other derived credentials such as SSH). These trust planes can be used to identify the ability to exploit trust relationships and to evaluate the compounding of trust across the network.

In another embodiment, identity ecosystem analyzer 150 can identify secrets-based threat intelligence. For example, identity ecosystem analyzer 150 can calculate and determine alerts identifying windows of exposure through the credential cluster chain of custody, calculate and determine alerts identifying the time to defeat assets protected by credential clusters, identify and determine alerts on threat vectors that differentiate between insider and external threats, user vs. machine threats, etc., and/or identify and determine alerts on credential cluster vulnerabilities, such as a weakest link credential, over-scoping of permissions, privilege escalation, exploitation of trust relationships, over-scoping of access to the credential clusters, long lived credentials protecting short lived credentials, etc.

In another embodiment, identity ecosystem analyzer 150 can generate and execute a recommendation engine. For example, identity ecosystem analyzer 150 can make recommendations regarding scoping of permissions between related credentials, a need for multi-factor authentication, a need for quorum based authorization, a change in credential rotation policy (e.g., more or less time), etc.

Figure 2:
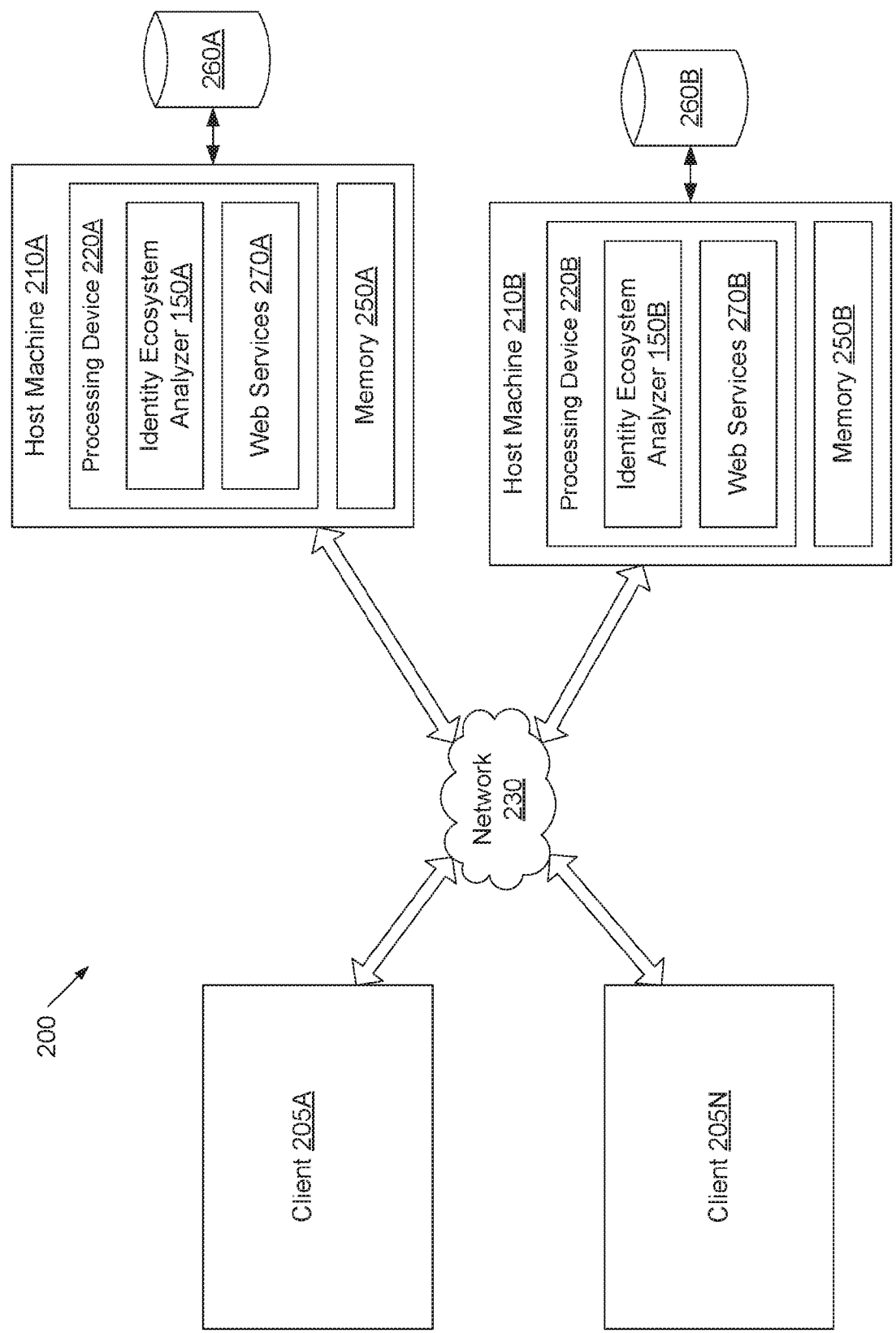
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more cloud computing devices, such as host machines 210A-210B forming a computing cluster, which may be employed to provide cloud computing services to one or more clients, such as client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, game consoles and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B. Each of processing devices 220A-220B may execute a corresponding instance of identity ecosystem analyzer 150 (i.e., 150A-150B) and/or one or more instances or partial instances of web services (i.e., web services 270A-270B).

In one embodiment, the data storage devices 260A-260B may be used to store unstructured data storage 130 and purpose built databases 140. The identity ecosystem analyzer instances 150A-150B running on each or either of host machines 210A-210B may retrieve the data from unstructured data storage 130 and/or from purpose built databases 140 in order to perform additional analyses to evaluate security threats, vulnerabilities and risk factors in identity ecosystem 100, as described herein.

Figure 3:
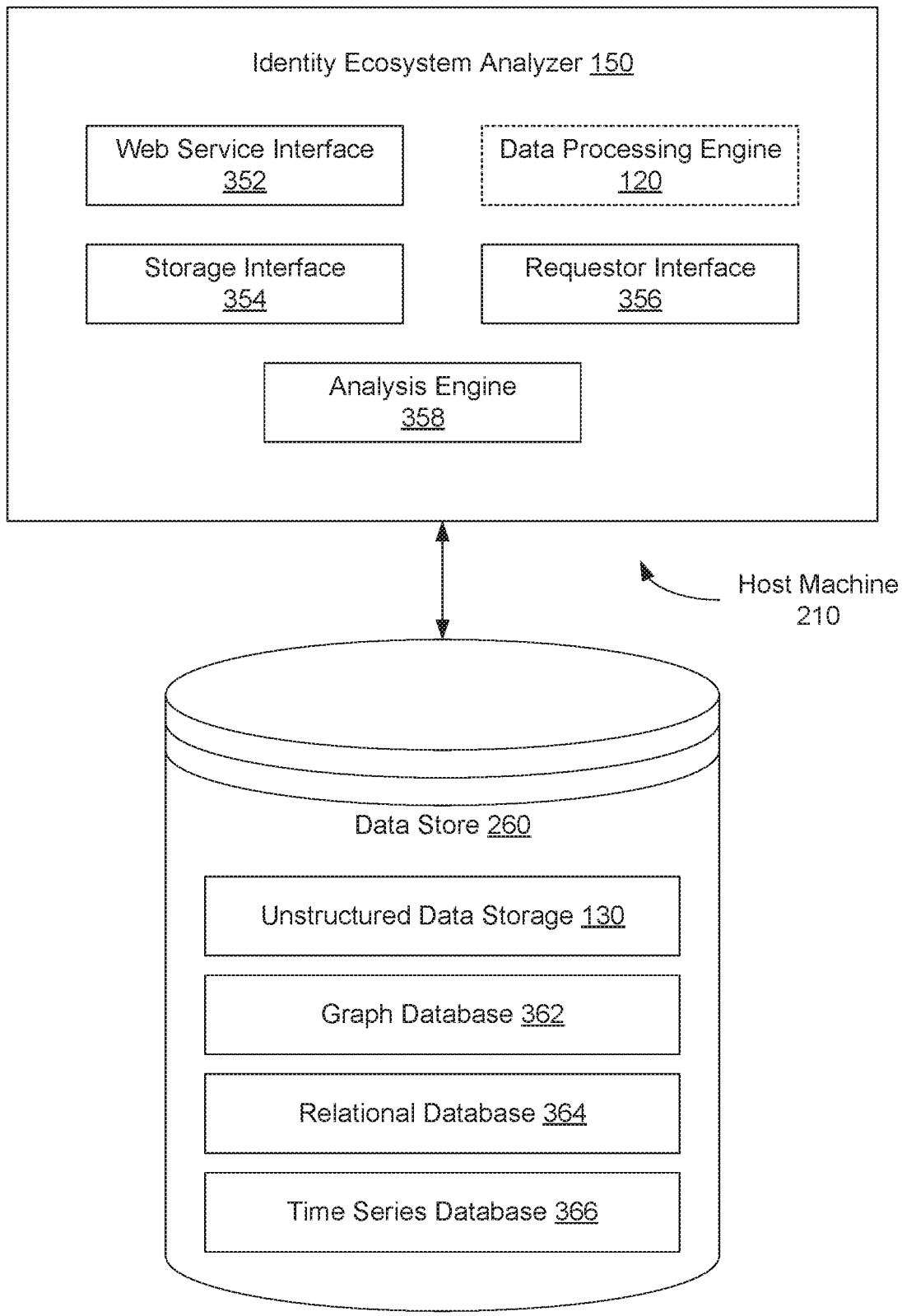
FIG. 3 is a block diagram illustrating an identity ecosystem analyzer, according to an embodiment of the present disclosure.

FIG. 3 is a block diagram illustrating identity ecosystem analyzer 150, according to an embodiment. In one embodiment, identity ecosystem analyzer 150 includes web service interface 352, storage interface 354, requestor interface 356, analysis engine 358, and optionally data processing engine 120. This arrangement of modules and components may be a logical separation, and in other embodiments, these modules or other components can be combined together or separated in further components, according to a particular implementation. In one embodiment, data store 260 is connected to identity ecosystem analyzer 150 and includes unstructured data storage 130 and one or more purpose built databases (such as purpose built databases 140) including graph database 362, relational database 364, and time series database 366. In one implementation, one physical node (e.g., host machine 210) may include both identity ecosystem analyzer 150 and data store 260. In another embodiment, data store 260 may be external to the physical node and may be connected over a network or other connection. In other implementations, the physical node and identity ecosystem analyzer 150 may include different and/or additional components and applications which are not shown to simplify the description. Data store 260 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, web service interface 352 manages interactions, including data exchange operations, with a plurality of web services (e.g., credential sources 110). For example, web service interface 352 may receive security data (e.g., raw data 112) from the web services, which may include information pertaining to principals, security credentials, permission policies, and resources managed by, or otherwise associated with, each of the plurality of web services. In addition, web service interface 352 may also provide service feedback data 154 to one or more of the web services in response to an analysis request.

In one embodiment, data processing engine 120 is part of or associated with identity ecosystem analyzer 150. In other embodiments, however, data processing engine 120 is separate from identity ecosystem analyzer 150. Data processing engine 120 processes the received security data to filter, transform or reformat the data. In one embodiment, data processing engine 120 receives the security data and parses the security data to separate out data pertaining to each of the principals, the credentials, the permission policies, and the resources. In other embodiments, data processing engine 120 may perform other operations to clean up the data (e.g., remove extraneous, duplicate, or unnecessary pieces of data), transform the data, filter the data, reformat the data, or other otherwise process the security data.

In one embodiment, storage interface 354 manages interactions with data store 260, including unstructured data storage 130, graph database 362, relational database 364, and time series database 366. In one embodiment, storage interface 354 stores the received security data separately in an unstructured data storage 130 (e.g., a data lake). Depending on the embodiment, the processed data 122 output by data processing engine 120 and/or the raw data 112 received directly from credential sources 110 can be stored in unstructured data storage 130. In one embodiment, storage interface 354 further generates one or more purpose built databases 140 from the security data in the unstructured data storage 130. In one embodiment, the one or more purpose built databases 140 merge the security data from the plurality of web services together to give an overall view of the identity ecosystem 100 spanning multiple web services. In one embodiment, the one or more purpose built databases comprises a graph database 362 comprising nodes representing each of the principals, security credentials, permission policies, and resources, wherein certain nodes are connected by edges representing relationships between the corresponding principals, security credentials, permission policies, and resources. In one embodiment, the one or more purpose built databases comprises a relational database 364 comprising a connected master index for the plurality of web services. In one embodiment, the one or more purpose built databases comprises a time series database 366 representing how the security data received from the web services evolves over time. Although separate databases, each of the one or more purpose built databases 140 may include security data received from multiple web services.

Relational database 364 may be the primary structured source for the basic facts and metadata regarding the principals, credentials, policies, resources, and actions. Analysis engine 358 can thus utilize relational database 364 to perform analyses including relationship queries and filters for data exploration, as well as applying metadata filters for reasoning in graphs and time. Examples of the relationship queries able to be performed using relational database 364 include: How many policies reference a specific principal?; Which resources are encrypted?; Which resources older than one year are tagged "sensitive"?; How many principals are tagged with "administrator"?; Which policies are tagged "administrative access"?; Among those policies, how many are attached to a Principal that is not tagged with "administrator"?

While some metadata values can be copied and stored within the graph database 362 or the time series database 366, those structures are not generally intended for highly relational queries. Thus, relational database 364 can be used as either a pre-query filter, or in an in-query reference. For example, if a query seeks to determine whether any roles have been added in the last week that contain a sensitive resource in their blast radius, analysis engine 358 may determine the answer using a combination of graph database 362 and relational database 364. In one embodiment, analysis engine may pre-query relational database 364 to identify the roles created in the past week, and then may use graph database 362 to identify the sensitive resources within the blast radius of those identified roles. When using graph clustering, distance calculations might rely on the dynamic properties of links computed on the fly from data in the relational database 364. For example, "less permissive policies" (e.g., those where the policy detail is stored in the relational database 364) might be assigned a further distance than more permissive (e.g., administrative) policies. These types of properties can be retrieved and computed from relational database 364 either before the clustering is run or while the cluster algorithm is running (depending on the scale and complexity of the graph and the calculation).

Time series database 366 stores data pertaining to the network of entities (i.e., principals, credentials, policies, and resources) including certain relevant historic events and an indication of a time that those events occurred. For example, for principals, time series database 366 may include the creation date, modification date, and/or a certain number (e.g., 100) of the last events in the system. For credentials, time series database 366 may include the creation date, refresh date, and/or a certain number (e.g., 100 of the last usage events (and who used them). For policies, time series database 366 may include the creation date, last 100 updates, and/or last 100 permissions checks (against which principals). For resources, time series database 366 may include the creation date, last 100 modifications, last 100 accesses (and who accessed with which credential.

With this type of data from time series database 366, analysis engine 358 can use a time series and forecast analysis for a number of types of security alerts. For example, analysis engine 358 may forecast time intervals of credential refresh, and generate a corresponding alert if a refresh is delayed beyond an established threshold. In addition, analysis engine 358 may forecast time bounds of credential and user usage (i.e., there might be regular times for a process using a credential), and generate an alert if singular events fall outside these bounds (e.g., if the credential has been compromised). Furthermore, analysis engine can use the timestamps and sequence detection algorithms to identify common patterns of resources accessed by principals with specific credentials. For example, this may be a way to identify common processing pipelines that occur throughout a system. Analysis engine may generate an alert upon occurrence of important deviations, such as a missed step in the pipeline, or new credentials used part way through the typical process (perhaps indicating that the pipeline has been hijacked by another principal), etc.

In one embodiment, requestor interface 356 receives, from a requestor, an analysis request pertaining to the plurality of web services. In one embodiment, the request is received from one of client devices 205A-205N. In another embodiment, the request is received from one of the plurality of web services (i.e., one of credential sources 110). The request may identify an entity, such as at least one of a principal, security credential, permission policy, or resource, and may include some query pertaining to that entity. In one embodiment, requestor interface 356 further transmits data including a response generated by analysis engine 358 to the requestor over a network, such as network 230. In another embodiment, requestor interface 356 optionally generates a visualization of the response, and optionally causes display of that visualization on a display device.

In one embodiment, analysis engine 358 executes an analysis using the one or more purpose built databases 140 to generate a response to the analysis request. Depending on the embodiment, the response may be specific to the query included in the analysis request. In general, however, the response may indicate a relationship between the at least one of the principal, the security credential, the permission policy, or the resource identified in the request and at least one other principal, security credential, permission policy, or resource in the identity ecosystem 100.

Figure 4:
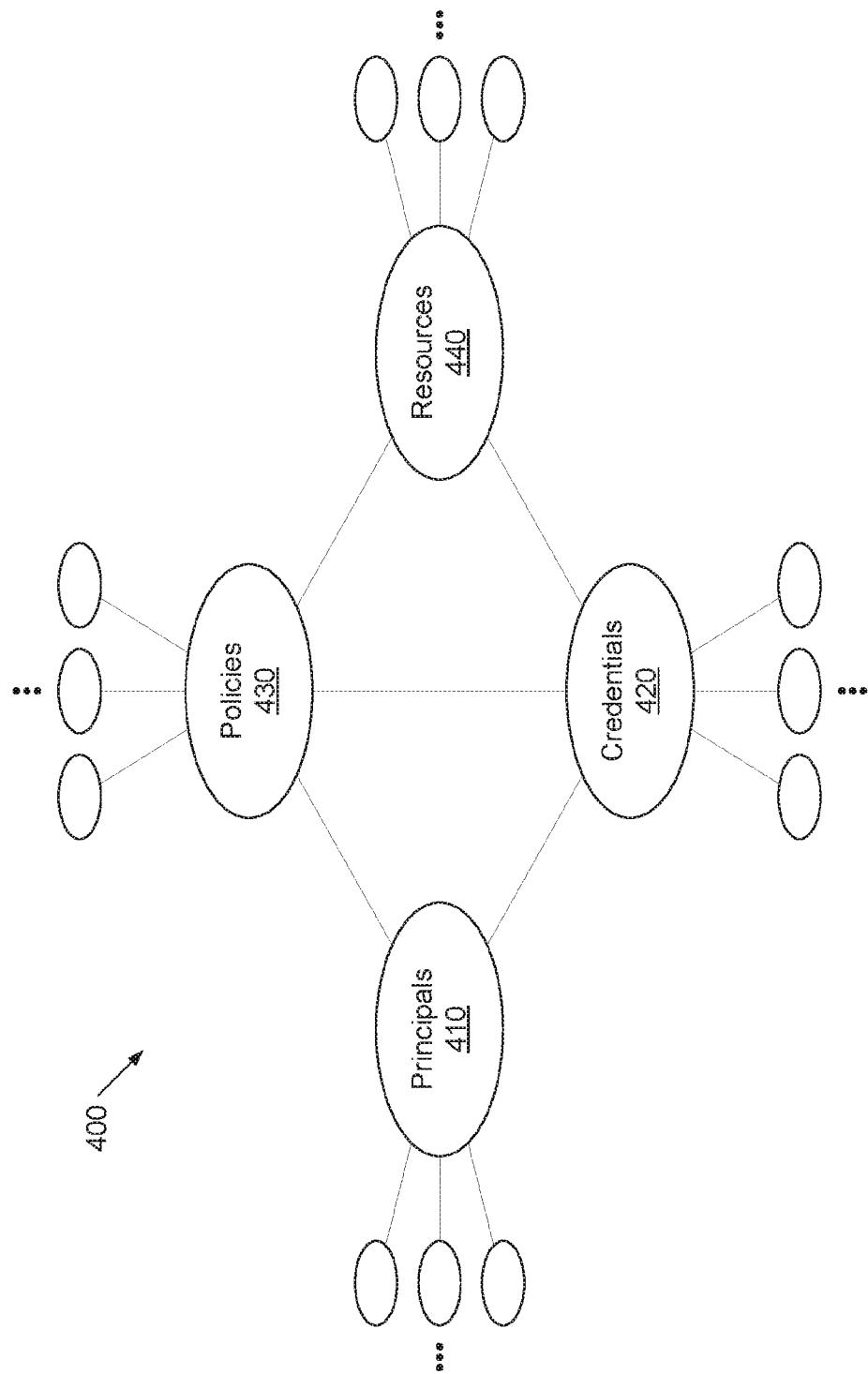
FIG. 4 is a block diagram illustrating relationships between entities identified from the information received from credential sources, according to an embodiment of the present disclosure.

FIG. 4 is a block diagram illustrating relationships between entities identified from the information received from credential sources, according to an embodiment of the present disclosure. As described above, in one embodiment, the raw data 112 received from credential sources 110 may include information pertaining to principals 410, credentials 420, permission policies 430, and resources 440. Diagram 400 in FIG. 4 is a graphical representation of the relationships between principals 410, credentials 420, permission policies 430, and resources 440.

A principal, such as one of principals 410, can include a user, role, account, service, or other entity that may attempt to access a resource provided by a web service. In one embodiment, each principal is assigned an identifier which uniquely identifies the associated principal and distinguishes the associated principal from other principals. Any request to access a resource provided by a web service may include the identifier or other indication of the requesting principal. The request may further include a credential, such as one of credentials 420, provided by the requesting principal. The credential is used to authenticate the principal and authorize requests made by the principal and can include, for example, a user name/password pair, a digital certificate, a cryptographic key, etc. The credential verifies who the principal is and can be used to determine whether the principal has permission to access the resources being requested when evaluated against a corresponding permission policy for the resource. A permission policy, such as one of permission policies 430, can be attached to a principal or a resource to define what actions can be taken or what requests can be made with respect to the corresponding principal and/or resource. In one embodiment, the permission policy further considers the credentials provided with a request in order to determine whether to grant or deny the request. For example, a permission policy attached to a certain resource may define that only certain principals may access the resource, or that any principal requesting access to the resource must have a certain credential in order to do so. A permission policy attached to a certain principal may define a list of resources that the principal is authorized to access, or what credentials must be provided by the principal in order to access certain resources. The resource itself, such as one of resources 440, can be any object or group of objects which are provided by or managed by the associated web service.

As illustrated in diagram 400, principals 410 have a direct relationship with credentials 420 and permission policies 430. Either credentials 420 or permission policies 430 can be directly associated with (e.g., owned by or reference) one of principals 410. For example, a credential can be assigned to a certain principal or a permission policy can reference a principal. Similarly, resources 440 have a direct relationship with credentials 420 and permission policies 430. Either credentials 420 or permission policies 430 can be directly associated with one of resources 440. For example, a credential can grant access to a certain resource or a permission policy can define who can access the resource. Finally, credentials 420 also have a direct relationship with permission policies 430. As described above, a permission policy may define that anyone requesting access to a particular resource must have a certain credential in order to be granted such access. Notably, there may not be direct relationship between principals 410 and resources 440. In general, a principal cannot directly access a resource unless access is granted by one of credentials 420 (e.g., granting access to the resource to the holder of the credential) or by one of policies 430 (e.g., specifying that the principal can access the resource).

Figure 5:
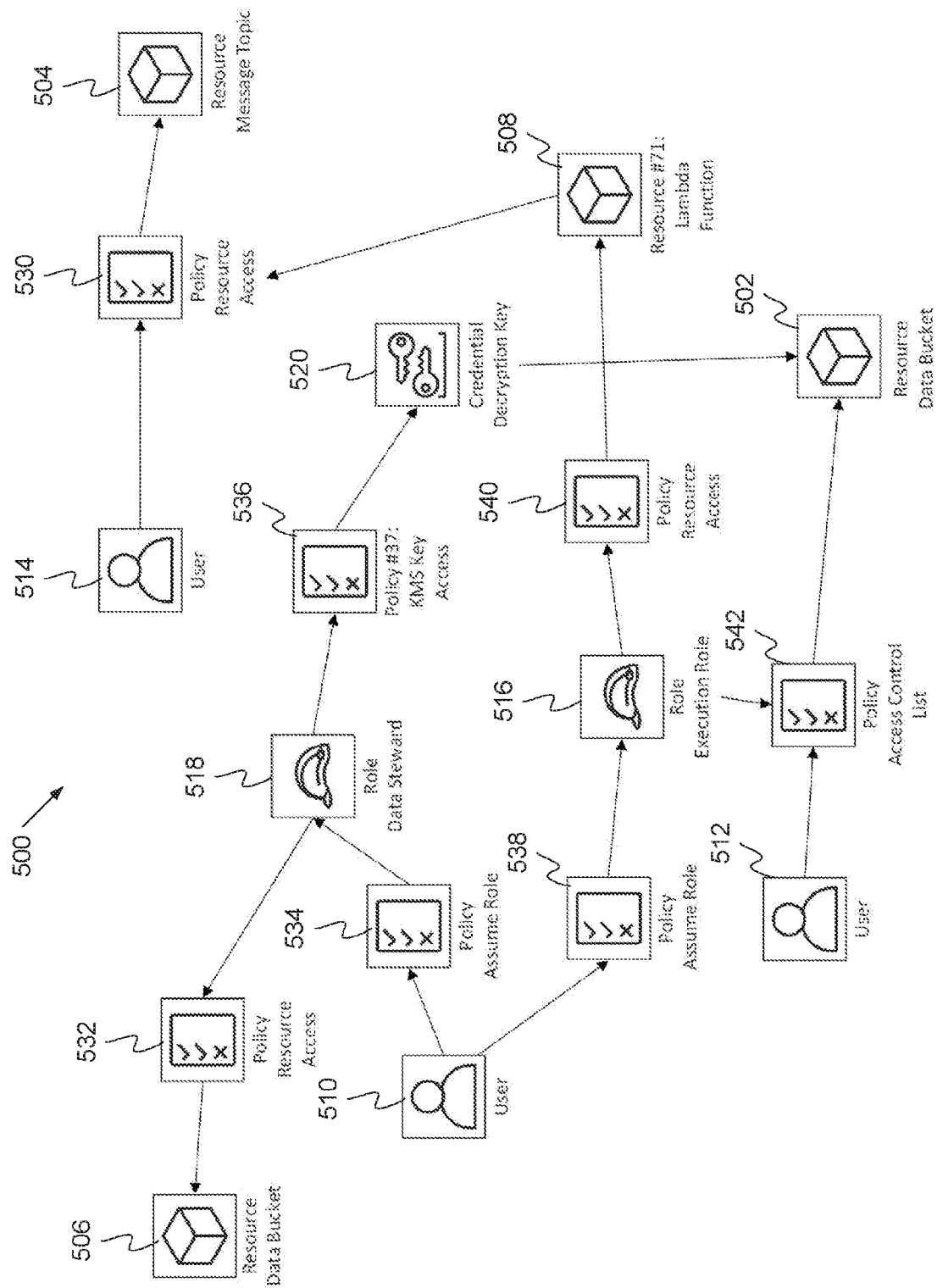
FIG. 5 is graph diagram illustrating a visualization from a graph database, according to an embodiment of the present disclosure.

FIG. 5 is graph diagram illustrating a visualization of a network 500 from a graph database, according to an embodiment of the present disclosure. In one embodiment, identity ecosystem analyzer 150 can generate the visualization from data stored in graph database 362. In the network 500, the nodes represent entities, such as principals, permission policies, credentials, and resources, and the edges represent connecting properties between the entities. For example, in the illustrated embodiment, resource 502 is a data bucket containing sensitive data encrypted by credential 520, resource 504 is a public-facing message topic with access control managed by permission policy 530, resource 506 is a data bucket containing sensitive, unencrypted data with access control managed by permission policy 532, and resource 508 is a processing function with access control managed by permission policy 540. Network 500 also includes a number of principal users 510, 512, and 514, and a number of principal roles 516 and 518. Network 500 further includes a number of permission policies 530, 532, 534, 536, 538, 540, and 542, which will be described in more detail below.

In one embodiment, identity ecosystem analyzer 150 analyzes the raw data 112 received from credential sources 110 and/or processed data 122 output by data processing engine 120 to build the graph database, including the visualization of network 500. Identity ecosystem analyzer 150 identifies all of the entities, including principals, permission policies, credentials, and resources and creates a corresponding node and connects the nodes with edges where there is some relationship between the entities. An analysis of the graph can then answer any number of questions pertaining to the identity ecosystem. For example, identity ecosystem analyzer 150 may receive a query asking which users can read the encrypted data in a particular resource, such as resource 502. As indicated by the graph, resource 502 includes data encrypted by credential 520. Thus, any user that wishes to access resource 502 must also possess or have access to credential 520. An examination of the graph indicates that policy 534 associates principal user 510 with principal role 518, and policy 536 associates credential 520, which can be used to decrypt the data of resource 502, with principal role 518. Accordingly, the graph indicates that principal user 510 can read the encrypted data of resource 502. Note that although policy 542 grants principal user 512 access to resource 502, principal user 512 does not possess credential 520, and thus cannot decrypt the data of resource 502.

In another example, identity ecosystem analyzer 150 may receive a query asking which users can publish messages to a particular resource, such as resource 504. As indicated by the graph, policy 530 grants principal user 514 access to resource 504. In addition, policy 538 associates principal user 510 with principal role 516, and policy 540 grants principal role 516 access to resource 508. Furthermore, policy 530 grants resource 508 access to resource 504, thereby enabling principal user 510 to access resource 504, albeit by a less direct route than principal user 514.

Another example of a user query may include can any one principal user access a certain set of resources, such as resources 502, 504, and 506. As described above, it has already been established that principal user 510 can access resource 502 and resource 504. The graph indicates in addition that principal user 510 can also access resource 506. Policy 534 associates user 510 with role 518, and policy 532 grants role 518 access to resource 506.

In one embodiment, identity ecosystem analyzer 150 may receive a query or command asking for a cluster analysis of the network 500. In response, identity ecosystem analyzer 150 may utilize any number of clustering algorithms, such as hierarchical clustering, centroid-based clustering, distribution-based clustering, density-based clustering, etc. to identify one or more clusters in the network 500. In one embodiment, the cluster analysis indicates that principal user 512 is only associated with resource 502 via permission policy 542. Accordingly, principal user 512, policy 542 and resource 502 may form one cluster. Closer examination of this cluster reveals that principal user 512 may be tasked with controlling permissions the data bucket of resource 502 (i.e., principal user 512 is a local policy administrator). In another embodiment, the cluster analysis indicates that principal user 514 is only associated with resource 504 via permission policy 530. Accordingly, principal user 514, policy 540 and resource 504 may form another cluster. Closer examination of this cluster reveals that principal user 514 is a content editor for resource 504. In another embodiment, the cluster analysis reveals that principal user 510 has exclusive access to resources 502 and 508. Accordingly, principal user 510, resources 502 and resource 508, and a number of policies and principal roles may form another cluster. Closer examination of this cluster reveals that principal user 510 is a data steward responsible for maintaining multiple data sources.

Figure 6:
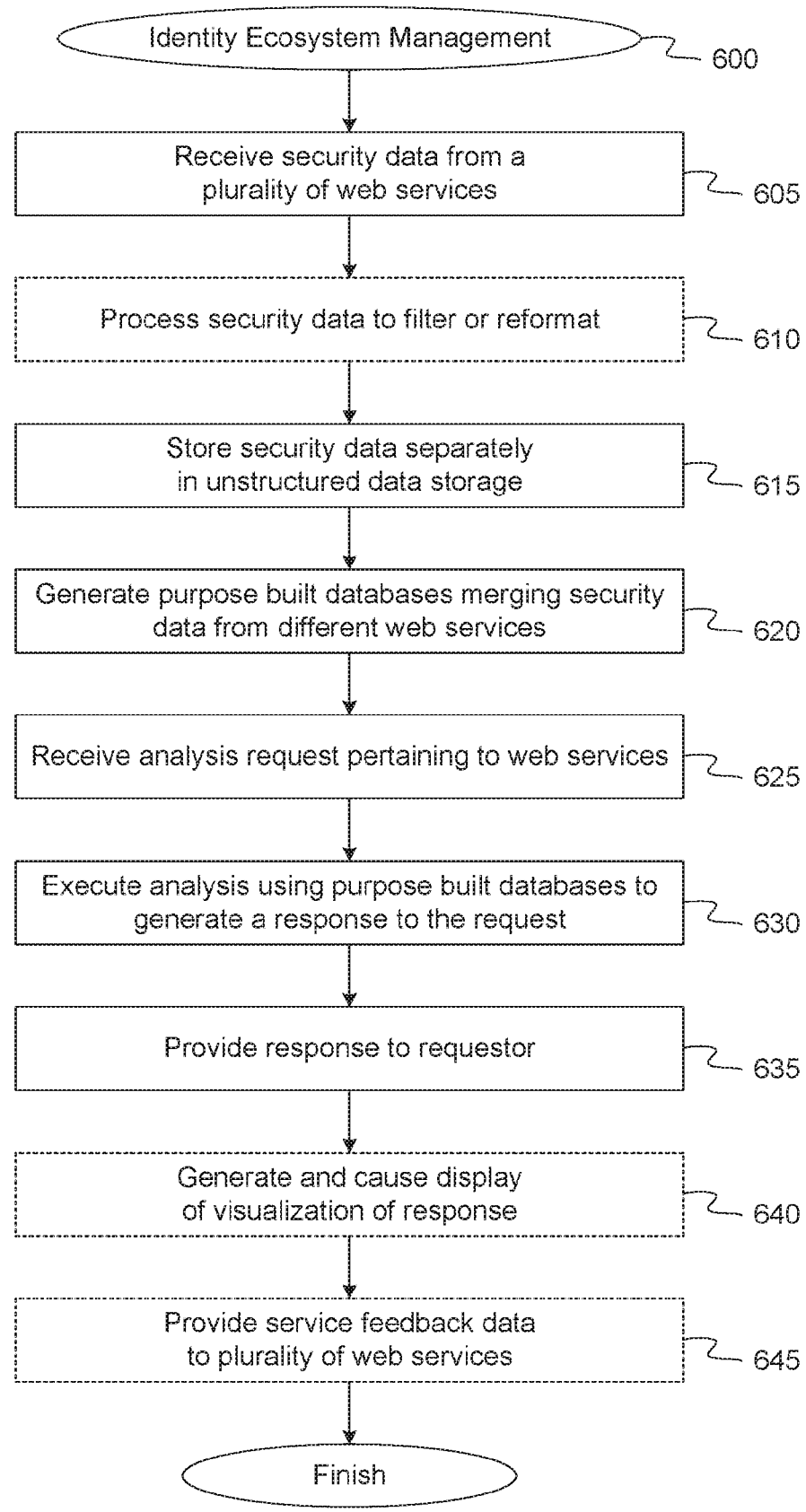
FIG. 6 is a flow diagram illustrating a method of identity ecosystem management, according to an embodiment of the present disclosure.

FIG. 6 is a flow diagram illustrating method of identity ecosystem management, according to an embodiment of the present disclosure. The method 600 may be performed by processing logic that comprises hardware (e.g., circuitry, dedicated logic, programmable logic, microcode, etc.), software, firmware, or a combination thereof. In one embodiment, the method 600 receives input data the data from a number of credential sources (e.g., web services), processes that input data as needed, stores the data and performs additional analyses to evaluate security threats, vulnerabilities and risk factors in the identity ecosystem 100. In one embodiment, method 600 may be performed by identity ecosystem analyzer 150, as shown in FIGS. 1-3.

Referring to FIG. 6, at block 605, method 600 receives security data from a plurality of web services (e.g., credential sources 110) associated with an organization. The organization may be, for example an enterprise, company, school, or other entity or group that utilizes, provides, or manages the web services. Depending on the embodiment, the security data may include information pertaining to principals, security credentials, permission policies, and resources managed by, or otherwise associated with, each of the plurality of web services. In one embodiment, identity ecosystem analyzer 150 receives a first set of security data from a first web service and a second set of security data from a second web service. The security data may be one embodiment of raw data 112 illustrated in FIG. 1.

At block 610, method 600 processes the security data to filter, transform or reformat the data. In one embodiment, data processing engine 120 receives the security data and parses the security data to separate out data pertaining to each of the principals, the credentials, the permission policies, and the resources. In other embodiments, data processing engine 120 may perform other operations to clean up the data (e.g., remove extraneous, duplicate, or unnecessary pieces of data), transform the data, filter the data, reformat the data, or other otherwise process the security data. In one embodiment, data processing engine 120 is part of or associated with identity ecosystem analyzer 150. In other embodiments, however, data processing engine 120 is separate from identity ecosystem analyzer 150.

At block 615, method 600 stores the security data separately in an unstructured data storage 130 (e.g., a data lake). Depending on the embodiment, the processed data 122 output by data processing engine 120 and/or the raw data 112 received directly from credential sources 110 can be stored in unstructured data storage 130. In one embodiment, the security data from each of the plurality of web services (e.g., the first web service and the second web service) is stored separately in unstructured data store 130. In another embodiment, the security data from each of the plurality of web services is intermingled in unstructured data storage 130. Unstructured data storage 130 can store the security data until such data is retrieved and further processed for additional analysis.

At block 620, method 600 generates one or more purpose built databases 140 from the security data in the unstructured data storage 130. In one embodiment, the one or more purpose built databases 140 merge the security data from the plurality of web services together to give an overall view of the identity ecosystem 100 spanning multiple web services. In one embodiment, the one or more purpose built databases comprises a graph database 362 comprising nodes representing each of the principals, security credentials, permission policies, and resources, wherein certain nodes are connected by edges representing relationships between the corresponding principals, security credentials, permission policies, and resources. In one embodiment, the one or more purpose built databases comprises a relational database 364 comprising a connected master index for the plurality of web services. In one embodiment, the one or more purpose built databases comprises a time series database 366 representing how the security data received from the web services evolves over time. Although separate databases, each of the one or more purpose built databases 140 may include security data received from multiple web services.

At block 625, method 600 receives, from a requestor, an analysis request pertaining to the plurality of web services. In one embodiment, the request is received from one of client devices 205A-205N. In another embodiment, the request is received from one of the plurality of web services (i.e., one of credential sources 110). The request may identify an entity, such as at least one of a principal, security credential, permission policy, or resource, and may include some query pertaining to that entity. For example, in one embodiment, the request the analysis request identifies a principal user of a first web service of the plurality of web services and asks what resources that principal user can access.

At block 630, method 600 executes an analysis using the one or more purpose built databases 140 to generate a response to the analysis request. Using the example request above, to execute the analysis, identity ecosystem analyzer 150 may determine from the graph database 362 at least one credential or permission policy associated with the principal user identified in the request and determine at least one resource managed by a second web service of the plurality of web services, wherein the at least one resource is accessible by the principal user via the at least one credential or permission policy associated with the principal user.

At block 635, method 600 provides a response to the requestor. Depending on the embodiment, the response may be specific to the query included in the analysis request. In general, however, the response may indicate a relationship between the at least one of the principal, the security credential, the permission policy, or the resource identified in the request and at least one other principal, security credential, permission policy, or resource in the identity ecosystem 100. In one embodiment, identity ecosystem analyzer 150 transmits data including the response to the requestor over a network, such as network 230. In another embodiment, identity ecosystem analyzer 150 optionally generates a visualization of the response at block 640, and optionally causes display of that visualization on a display device. The graph of network 500, as shown in FIG. 5, is one example of the visualization that might be generated. In another embodiment, identity ecosystem analyzer 150 optionally provides service feedback data 154 to one or more of the web services at block 650.

Figure 7A:
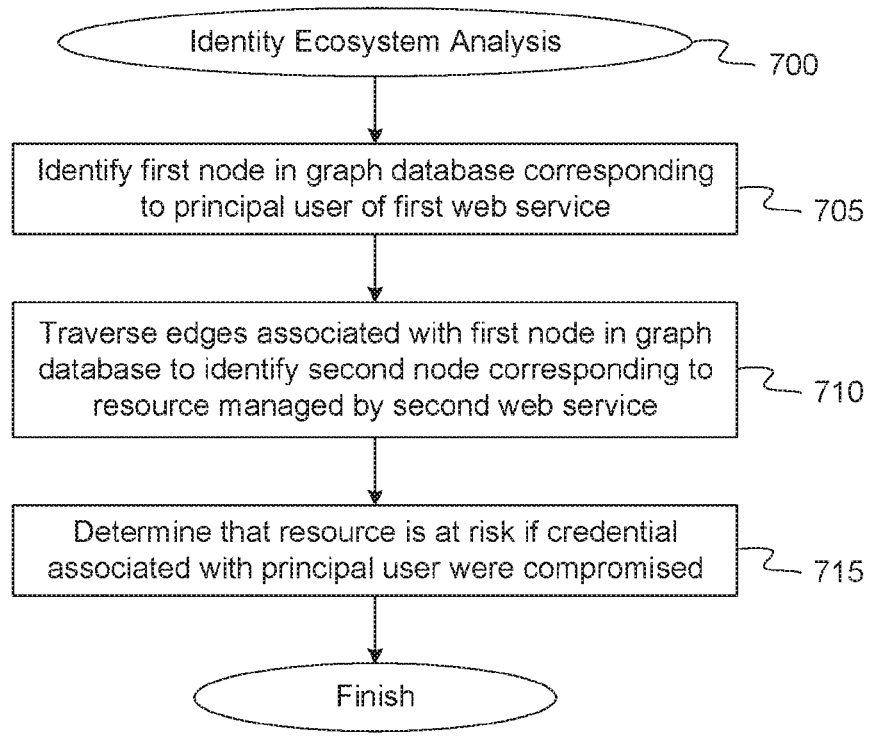
FIGS. 7A and 7B are flow diagrams illustrating methods of identity ecosystem analysis using a graph database, according to an embodiment of the present disclosure.
Figure 7B:
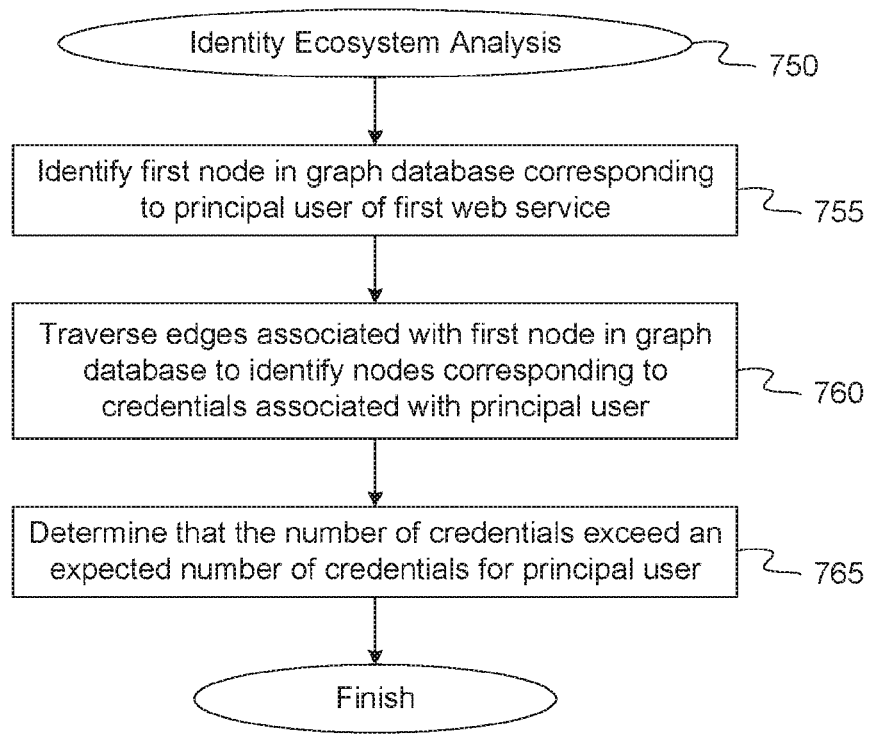

FIGS. 7A and 7B are flow diagrams illustrating methods of identity ecosystem analysis using a graph database, according to an embodiment of the present disclosure. The methods 700 and 750 may be performed by processing logic that comprises hardware (e.g., circuitry, dedicated logic, programmable logic, microcode, etc.), software, firmware, or a combination thereof. In one embodiment, methods 700 and 750 may be performed by identity ecosystem analyzer 150, as shown in FIGS. 1-3.

Referring to FIG. 7A, at block 705, method 700 identifies a first node in the graph database 362 corresponding to a principal user of a first web service of the plurality of web services (e.g., credential sources 110). For example in response to a request from a user specifying the user, analysis engine 358 identifies the node corresponding to the user, such as principal user 510, as illustrated in FIG. 5. At block 710, method 700 traverses one or more edges associated with the first node in the graph database 362 to identify a second node corresponding to a resource managed by a second web service of the plurality of web services. In one embodiment, analysis engine 358 uses one of a number of supported graph query languages (e.g., Gremlin, SPARQL) to identify the edges representing connecting properties between the nodes and determine the nodes corresponding to resources, such as resource 502, which are connected to the node corresponding to the user. At block 715, method 700 determines that the resource is at risk if a credential associated with the first principal user were to be compromised. As described above resource 502 includes data encrypted by credential 520 to which principal user 510 is granted access by policy 536. Thus, analysis engine 358 can determine that resource 502 would be accessible (i.e., at risk) by any other user who was able to obtain the credential 520, which is normally associated with principal user 510.

Referring to FIG. 7B, at block 755, method 750 identifies a first node in the graph database 362 corresponding to a principal user of a first web service of the plurality of web services (e.g., credential sources 110). For example in response to a request from a user specifying the user, analysis engine 358 identifies the node corresponding to the user, such as principal user 510, as illustrated in FIG. 5. At block 760, method 750 traverses one or more edges associated with the first node in the graph database 362 to identify a plurality of nodes corresponding to a number of credentials associated with the principal user. In one embodiment, analysis engine 358 a supported graph query language to identify the edges representing connecting properties between the nodes and determine the nodes corresponding to credentials, such as credential 520, which are connected to the node corresponding to the user. At block 765, method 750 determines that the number of credentials associated with the principal user exceeds an expected number of credentials for the principal user. For example, relational database 364 may include an indication of the expected number of credentials for the principal user. The expected number of credentials may be based on a role associated with the user, job title, job function, level of experience, tenure with the organization etc. In one embodiment, analysis engine 358 compares the number of credentials associated with the principal user determined from the graph database 362 with the expected number of credentials. In one embodiment, analysis engine 358 may determine whether the actual number of credentials exceeds the expected number, exceeds the expected number by a threshold amount, exceeds the expected number by an order of magnitude, etc.

Figure 8A:
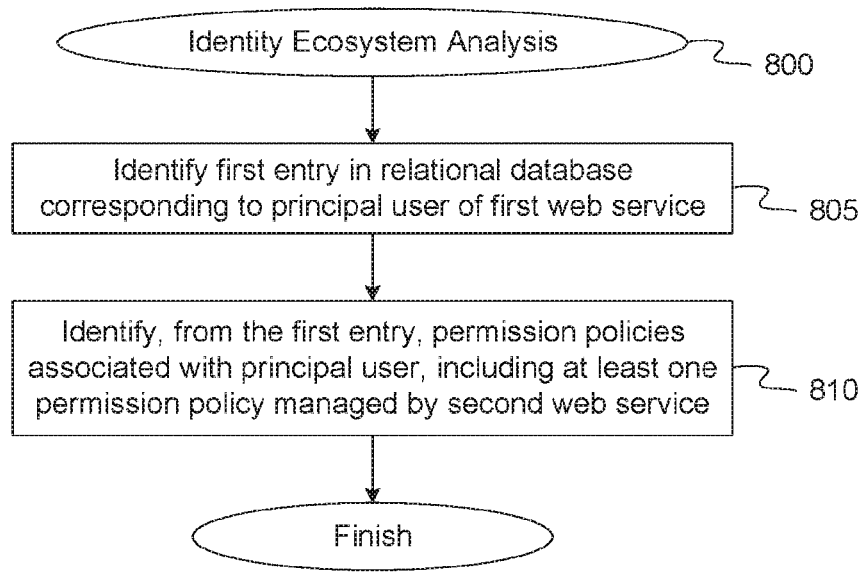
FIGS. 8A and 8B are flow diagrams illustrating methods of identity ecosystem analysis using a relational database, according to an embodiment of the present disclosure.
Figure 8B:
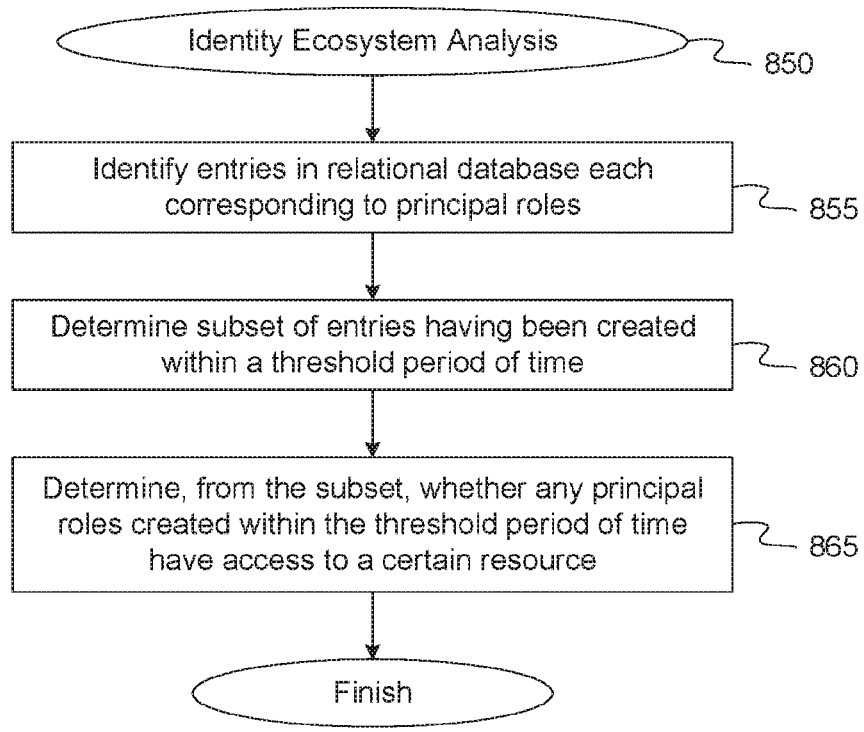

FIGS. 8A and 8B are flow diagrams illustrating methods of identity ecosystem analysis using a relational database, according to an embodiment of the present disclosure. The methods 800 and 850 may be performed by processing logic that comprises hardware (e.g., circuitry, dedicated logic, programmable logic, microcode, etc.), software, firmware, or a combination thereof. In one embodiment, methods 800 and 850 may be performed by identity ecosystem analyzer 150, as shown in FIGS. 1-3.

Referring to FIG. 8A, at block 805, method 800 identifies a first entry in the relational database 364 corresponding to a principal user of a first web service of the plurality of web services (e.g., credential sources 110). For example, the principal user may be identified in the relational database 364 by name, unique identification number, employee number, social security number, etc. In one embodiment, there is one entry in relational database 364 for each individual principal user. At block 810, method 800 identifies, from the first entry in the relational database 364, a plurality of permission policies associated with the principal user, the plurality of permission policies including at least one permission policy maintained by a second web service of the plurality of web services. In one embodiment, the entry corresponding to the principal user may further include data element indicating which permission policies reference the corresponding principal user (either granting access or restriction access to certain credentials, resources, etc.). In one embodiment, analysis engine 358 can execute a query against relational database 364 to retrieve the indications of the associated permission polices.

Referring to FIG. 8B, at block 855, method 850 identifies a plurality of entries in the relational database 364 each corresponding to principal roles. In one embodiment, there is one entry in relational database 364 for each individual principal role, where the entry includes additional information pertaining to the role, such as when the role was created, what users are associated with the role, what permission policies reference the role, etc. At block 860, method 850 determines a subset of the plurality of entries corresponding to principal roles having been created within a threshold period of time. In one embodiment, analysis engine 358 filters the identified entries based on the data indicating when each role was created. For example, analysis engine 358 may issue a query to return all roles which were created after a certain date/time or within a certain period of time of the current date/time. At block 865, method 850 determines, from the subset of the plurality of entries, whether any of the principal roles created within the threshold period of time have access to a resource, such as resource 502, provided by one of the plurality of web services (e.g., credential sources 110). In one embodiment, analysis engine 358 uses either graph database 362 or relational database 364 to identify the resources to which the recently created roles have access and determines whether the resource of interest is among those identified resources.

Figure 9A:
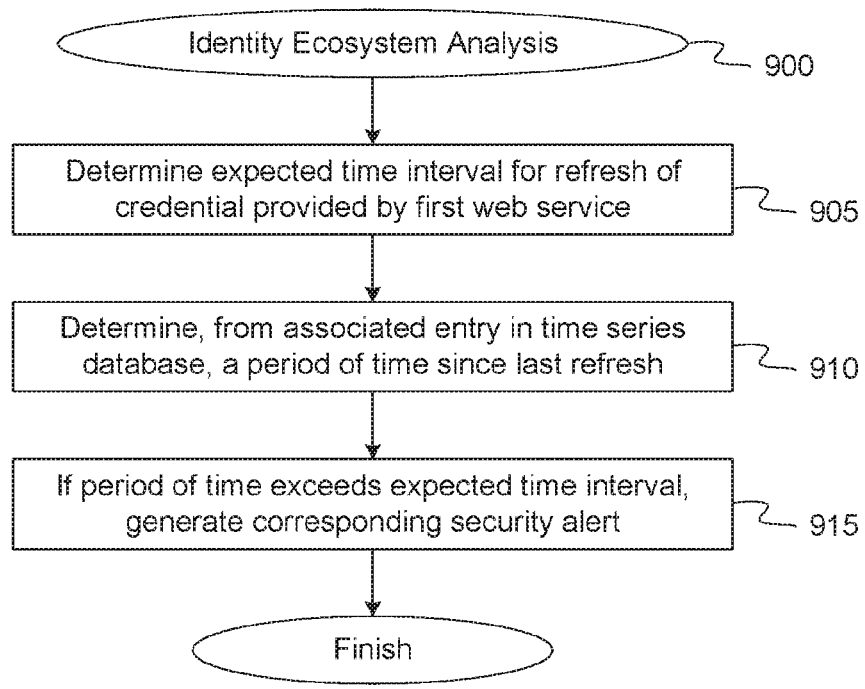
FIGS. 9A and 9B are flow diagrams illustrating methods of identity ecosystem analysis using a time series database, according to an embodiment of the present disclosure.
Figure 9B:
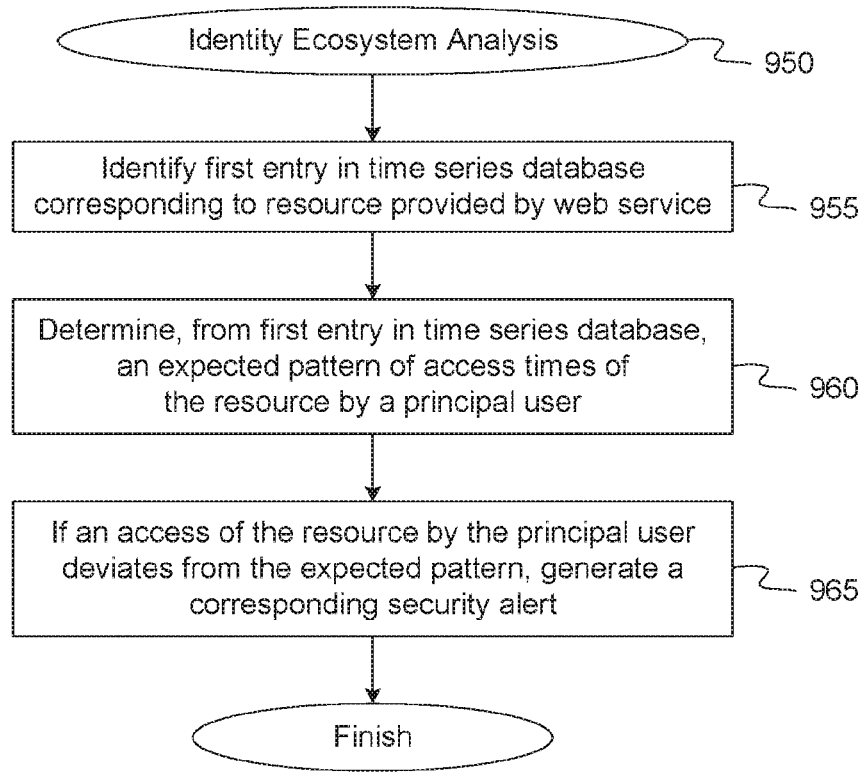

FIGS. 9A and 9B are flow diagrams illustrating methods of identity ecosystem analysis using a time series database, according to an embodiment of the present disclosure. The methods 900 and 950 may be performed by processing logic that comprises hardware (e.g., circuitry, dedicated logic, programmable logic, microcode, etc.), software, firmware, or a combination thereof. In one embodiment, methods 900 and 950 may be performed by identity ecosystem analyzer 150, as shown in FIGS. 1-3.

Referring to FIG. 9A, at block 905, method 900 determines an expected time interval for refresh of a credential provided by a first web service of the plurality of web services, the credential associated with a first entry in the time series database 366. In one embodiment, the time series database 366 includes an entry corresponding to the credential where the entry includes data indicating each time that the credential has been refreshed historically. In another embodiment, the time series database includes a separate sentry for each event when the credential was previously refreshed. Analysis engine 358 can determine an average time interval between refresh events from the time series data. At block 910, method 900 determines, from the first entry in the time series database 366, a period of time since a last refresh of the credential. For example, analysis engine 358 may compare the period of time between the current day/time and the last refresh event for the credential to the expected time interval. If the period of time exceeds the expected time interval, at block 915, method 900 generates a corresponding security alert. In one embodiment, analysis engine 358 may determine whether the period of time exceeds the expected time interval, exceeds the expected time interval by a threshold amount, exceeds the expected time interval by an order of magnitude, etc. The security alert may include, for example, an email, SMS message, pop-up message, event indication, or other alert, optionally presented by requestor interface 356.

Referring to FIG. 9B, at block 955, method 950 identifies a first entry in the time series database 366 corresponding to a resource provided by one of the plurality of web services (e.g., credential sources 110). In one embodiment, the time series database 366 includes an entry corresponding to the resource where the entry includes data indicating each time that the resource has been accessed historically. In another embodiment, the time series database 366 includes a separate sentry for each event when the resource was previously accessed. At block 960, method 950 determines, from the first entry in the time series database 366, an expected pattern of access times of the resource by a principal user. In one embodiment, analysis engine 358 can determine an average time interval between access events, or other pattern (e.g., most common day/time of access) from the time series data. If an access of the resource by the principal user deviates from the expected pattern, at block 965, method 950 generates a corresponding security alert. In one embodiment, analysis engine 358 may determine whether a current access deviates from the expected pattern (e.g., uses a different credential, is made by a different user, is made at a different day/time). The security alert may include, for example, an email, SMS message, pop-up message, event indication, or other alert, optionally presented by requestor interface 356.

Figure 10:
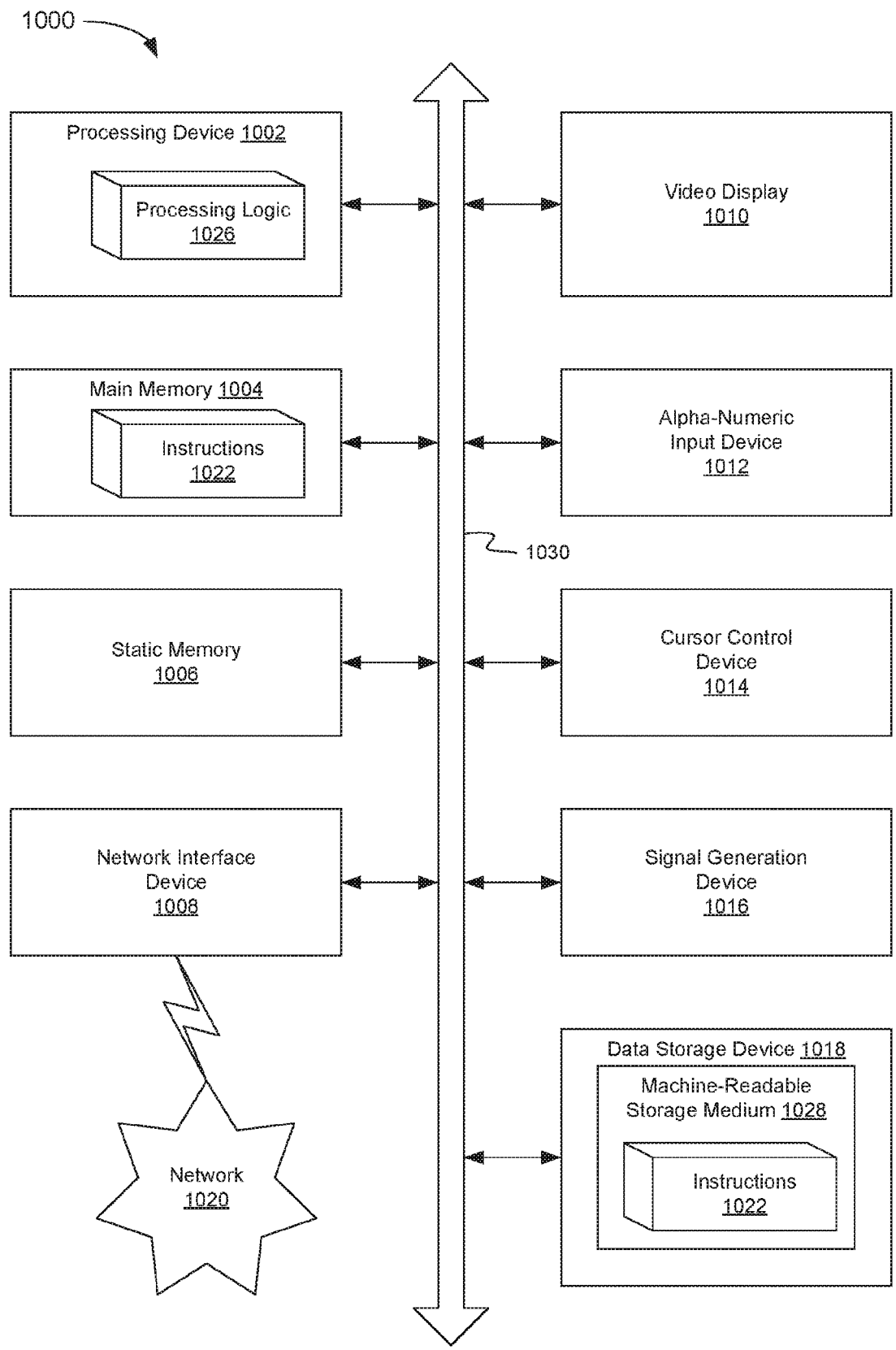
FIG. 10 depicts an example computer system which can perform any one or more of the operations described herein, in accordance with one or more aspects of the present disclosure.

FIG. 10 depicts an example computer system 1000 which can perform any one or more of the methods described herein, in accordance with one or more aspects of the present disclosure. In one example, computer system 1000 may correspond to a computing device capable of executing one or more components of the FMS architecture described herein. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker). In one illustrative example, the video display unit 1010, the alphanumeric input device 1012, and the cursor control device 1014 may be combined into a single component or device (e.g., an LCD touch screen).

The data storage device 1018 may include a computer-readable medium 1028 on which the instructions 1022 (e.g., implementing identity ecosystem analyzer 150) embodying any one or more of the methodologies or functions described herein is stored. The instructions 1022 may also reside, completely or at least partially, within the main memory 1004 and/or within the processing device 1002 during execution thereof by the computer system 1000, the main memory 1004 and the processing device 1002 also constituting computer-readable media. The instructions 1022 may further be transmitted or received over a network via the network interface device 1008.

While the computer-readable storage medium 1028 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving first security data from a first web service, the first security data comprising information pertaining to principals, security credentials, permission policies, and resources managed by the first web service;
   receiving second security data from a second web service, the second security data comprising information pertaining to principals, security credentials, permission policies, and resources managed by the second web service;
   storing the first security data and the second security data in an unstructured data storage;
   generating a plurality of purpose built databases combining the first security data and the second security data from the unstructured data storage, the plurality of purpose built databases comprising a graph database, a relational database, and a time series database, the plurality of purpose built databases representing an identity ecosystem comprising the first web service and the second web service;
   receiving, from a requestor, a query pertaining to the identity ecosystem, the query identifying at least one of a principal, a security credential, a permission policy, or a resource;
   executing an analysis using one or more of the purpose built databases to generate a response to the query, the response indicating a relationship between the at least one of the principal, the security credential, the permission policy, or the resource identified in the query and at least one other principal, security credential, permission policy, or resource in the identity ecosystem; and
   providing the response to the query to the requestor.

2. The method of claim 1, wherein the query identifies a principal user of the first web service, and wherein executing the analysis comprises determining from the graph database at least one credential or permission policy associated with the principal user and at least one resource managed by the second web service that is accessible by the principal user via the at least one credential or permission policy.

3. The method of claim 1, further comprising:
   generating a visualization of the response to the query; and
   causing display of the visualization.

4. A computing device comprising:
   one or more processors; and
   memory to store computer-executable instructions that, on execution, cause the one or more processors to:
      receive security data from a plurality of web services associated with an organization, the security data comprising information pertaining to principals, security credentials, permission policies, and resources managed by each of the plurality of web services;
      store the security data separately in an unstructured data storage;
      generate one or more purpose built databases from the security data in the unstructured data storage, the one or more purpose built databases merging the security data from the plurality of web services, and the one or more purpose built databases comprising a graph database, wherein the graph database comprises nodes representing each of the principals, security credentials, permission policies, and resources, and wherein certain nodes in the graph database are connected by edges representing relationships between the corresponding principals, security credentials, permission policies, and resources;
      receive, from a requestor, an analysis request pertaining to the plurality of web services, wherein the analysis request identifies a principal user of a first web service of the plurality of web services;
      execute an analysis using the one or more purpose built databases to generate a response to the analysis request, wherein to execute the analysis, the one or more processors to determine from the graph database at least one credential or permission policy associated with the principal user and at least one resource managed by a second web service of the plurality of web services, wherein the at least one resource is accessible by the principal user via the at least one credential or permission policy; and
      provide the response to the analysis request to the requestor.

5. The computing device of claim 4, wherein the one or more processors further to:
   process the security data to at least one of filter, transform or reformat the security data prior to storing the security data in the unstructured data storage.

6. The computing device of claim 4, wherein to execute the analysis, the one or more processors to:
   identify a first node in the graph database corresponding to a principal user of a first web service of the plurality of web services;
   traverse one or more edges associated with the first node in the graph database to identify a second node corresponding to a resource managed by a second web service of the plurality of web services; and
   determine that the resource is at risk if a credential associated with the first principal user were to be compromised.

7. The computing device of claim 4, wherein to execute the analysis, the one or more processors to:
- identify a first node in the graph database corresponding to a principal user of a first web service of the plurality of web services;
- traverse one or more edges associated with the first node in the graph database to identify a plurality of nodes corresponding to a number of credentials associated with the principal user; and
- determine that the number of credentials associated with the principal user exceeds an expected number of credentials for the principal user.

8. The computing device of claim 4, wherein the one or more purpose built databases comprises a relational database, the relational database comprising a connected master index for the plurality of web services.

9. The computing device of claim 8, wherein to execute the analysis, the one or more processors to:
- identify a first entry in the relational database corresponding to a principal user of a first web service of the plurality of web services; and
- identify, from the first entry in the relational database, a plurality of permission policies associated with the principal user, the plurality of permission policies including at least one permission policy maintained by a second web service of the plurality of web services.

10. The computing device of claim 8, wherein to execute the analysis, the one or more processors to:
- identify a plurality of entries in the relational database each corresponding to principal roles;
- determine a subset of the plurality of entries corresponding to principal roles having been created within a threshold period of time; and
- determine, from the subset of the plurality of entries, whether any of the principal roles created within the threshold period of time have access to a resource provided by one of the plurality of web services.

11. The computing device of claim 4, wherein the one or more purpose built databases comprises a time series database representing how the security data evolves over time.

12. The computing device of claim 11, wherein to execute the analysis, the one or more processors to:
- determine an expected time interval for refresh of a credential provided by a first web service of the plurality of web services, the credential associated with a first entry in the time series database;
- determine, from the first entry in the time series database, a period of time since a last refresh of the credential; and
- if the period of time exceeds the expected time interval, generate a corresponding security alert.

13. The computing device of claim 11, wherein to execute the analysis, the one or more processors to:
- identify a first entry in the time series database corresponding to a resource provided by one of the plurality of web services;
- determine, from the first entry in the time series database, an expected pattern of access times of the resource by a principal user; and
- if an access of the resource by the principal user deviates from the expected pattern, generate a corresponding security alert.

14. The computing device of claim 4, wherein the one or more processors further to:
- generate a visualization of the response to the analysis request; and
- cause display of the visualization.

15. The computing device of claim 4, wherein the one or more processors further to:
- provide service feedback data to at least one of the plurality of web services, the service feedback data comprising the response to the analysis request.

16. A method comprising:
- receiving security data from a plurality of web services associated with an organization, the security data comprising information pertaining to principals, security credentials, permission policies, and resources managed by each of the plurality of web services;
- storing the security data separately in an unstructured data storage;
- generating one or more purpose built databases from the security data in the unstructured data storage, the one or more purpose built databases merging the security data from the plurality of web services, and the one or more purpose built databases comprising a graph database, wherein the graph database comprises nodes representing each of the principals, security credentials, permission policies, and resources, and wherein certain nodes in the graph database are connected by edges representing relationships between the corresponding principals, security credentials, permission policies, and resources;
- receiving, from a requestor, an analysis request pertaining to the plurality of web services;
- executing an analysis using the one or more purpose built databases to generate a response to the analysis request, wherein the analysis identifies, using the graph database, a relationship between at least a first one of the principals, security credentials, permission policies, and resources managed by a first web service of the plurality of web services and at least a second one of the principals, security credentials, permission policies, and resources managed by a second web service of the plurality of web services; and
- providing the response to the analysis request to the requestor.

17. The method of claim 16, wherein the analysis request identifies a principal user of a first web service of the plurality of web services, and wherein executing the analysis comprises determining from the graph database at least one credential or permission policy associated with the principal user and at least one resource managed by a second web service of the plurality of web services, wherein the at least one resource is accessible by the principal user via the at least one credential or permission policy.

18. The method of claim 16, wherein the one or more purpose built databases comprises a relational database, the relational database comprising a connected master index for the plurality of web services.

19. The method of claim 16, wherein the one or more purpose built databases comprises a time series database representing how the security data evolves over time.

20. The method of claim 16, further comprising:
- generating a visualization of the response to the analysis request; and
- causing display of the visualization.

21. The method of claim 16, further comprising:
- providing service feedback data to at least one of the plurality of web services, the service feedback data comprising the response to the analysis request.

* * * * *